(12) United States Patent
Patchava et al.

(10) Patent No.: US 12,431,741 B2
(45) Date of Patent: Sep. 30, 2025

(54) TECHNIQUES FOR LOAD RESISTANCE SIGNALING FOR WIRELESS POWER TRANSFER

(71) Applicant: QUALCOMM Incorporated, San Diego, CA (US)

(72) Inventors: Raviteja Patchava, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/170,134

(22) Filed: Feb. 16, 2023

(65) Prior Publication Data

US 2024/0283295 A1  Aug. 22, 2024

(51) Int. Cl.
*H02J 50/20* (2016.01)
*H02J 50/80* (2016.01)

(52) U.S. Cl.
CPC ............. *H02J 50/20* (2016.02); *H02J 50/80* (2016.02)

(58) Field of Classification Search
CPC ................................. H02J 50/20; H02J 50/80
See application file for complete search history.

(56) References Cited

U.S. PATENT DOCUMENTS

| | | | |
|---|---|---|---|
| 9,888,337 B1 * | 2/2018 | Zalewski | G06Q 30/0635 |
| 10,176,416 B1 * | 1/2019 | Lektomiller | G06K 19/07773 |
| 10,383,126 B2 * | 8/2019 | Gollakota | H04W 28/0221 |
| 12,153,992 B2 * | 11/2024 | Liu | G06K 7/10366 |
| 2007/0117596 A1 * | 5/2007 | Greene | H02J 50/20 455/343.1 |
| 2009/0174361 A1 * | 7/2009 | Duron | H02J 5/00 320/101 |
| 2016/0301257 A1 * | 10/2016 | Parks | H02J 50/20 |
| 2018/0366984 A1 * | 12/2018 | Joye | H02J 50/12 |
| 2020/0259365 A1 * | 8/2020 | Chakrabartty | H04B 5/22 |
| 2021/0119726 A1 * | 4/2021 | Kim | G06N 3/08 |
| 2022/0225402 A1 * | 7/2022 | Elkotby | H04W 74/004 |
| 2022/0376555 A1 | 11/2022 | Landis et al. | |

(Continued)

OTHER PUBLICATIONS

Ayir N., et al., "Joint Impact of Input Power, PAPR, and Load Resistance on the Receiver Efficiency of Multisine Waveforms in RF Energy Harvesting", 2021 IEEE MTT-S Wireless Power Transfer Conference (WPTC 2021), Jun. 23, 2021, 4 Pages, XP033929469, Sections II-IV.

(Continued)

*Primary Examiner* — Menatoallah Youssef
*Assistant Examiner* — Khareem E Almo
(74) *Attorney, Agent, or Firm* — Guang Y. Zhang; Patterson & Sheridan LLP

(57) ABSTRACT

Certain aspects of the present disclosure provide techniques for load resistance signaling for wireless power transfer. A method for wireless communication by a first wireless communication device includes receiving, from a second wireless communication device, a first plurality radio frequency (RF) signals, performing power measurements associated with the first plurality of RF signals, and transmitting, based in part on the power measurements, information indicating a waveform for the second wireless communication device to use to transmit a second plurality of RF signals to the first wireless communication device.

25 Claims, 11 Drawing Sheets

(56) References Cited

U.S. PATENT DOCUMENTS

| | | | | |
|---|---|---|---|---|
| 2023/0026315 A1* | 1/2023 | Shrivastava | ............ | H01Q 3/22 |
| 2023/0141393 A1* | 5/2023 | Elshafie | ............... | H04W 76/15 |
| | | | | 307/104 |
| 2023/0254886 A1* | 8/2023 | Gupta | .............. | H02J 13/00002 |
| | | | | 370/329 |
| 2024/0356375 A1* | 10/2024 | Henry | .................... | H02J 7/342 |
| 2024/0421856 A1* | 12/2024 | Patchava | ................. | H04B 5/77 |

OTHER PUBLICATIONS

International Search Report and Written Opinion—PCT/US2024/014399—ISA/EPO—Jun. 7, 2024.

* cited by examiner

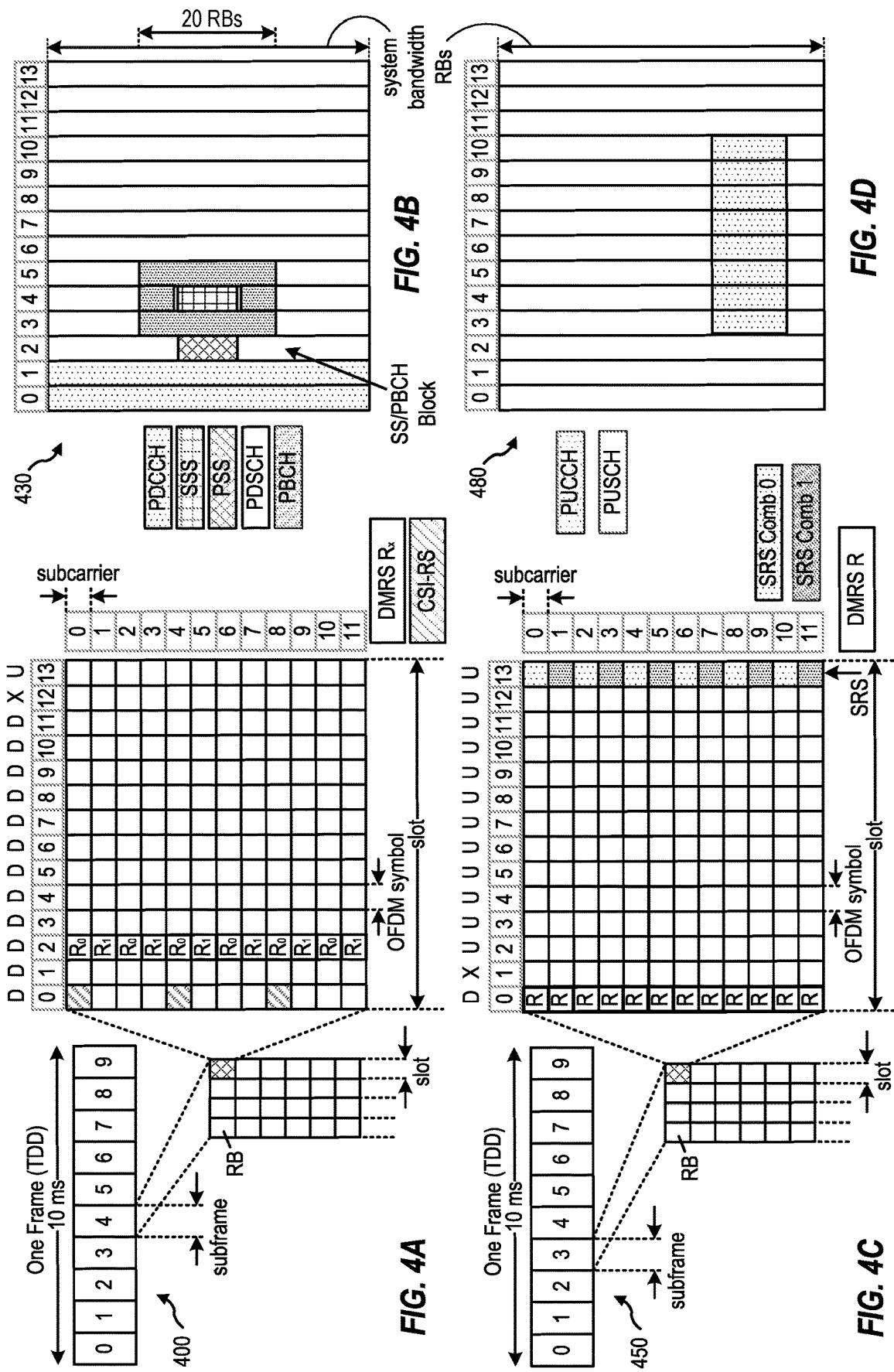

TECHNIQUES FOR LOAD RESISTANCE SIGNALING FOR WIRELESS POWER TRANSFER

BACKGROUND

Field of the Disclosure

Aspects of the present disclosure relate to wireless communications, and more particularly, to techniques for load resistance signaling for wireless power transfer.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a first wireless communication device. The method includes receiving, from a second wireless communication device, a first plurality of radio frequency (RF) signals; performing power measurements associated with the first plurality of RF signals; and transmitting, based in part on the power measurements, information indicating a waveform for the second wireless communication device to use to transmit a second plurality of RF signals to the first wireless communication device.

Another aspect provides a method for wireless communication by a second wireless communication device. The method includes transmitting, to a first wireless communication device, a first plurality RF signals; receiving, based on the first plurality of RF signals, information indicating a waveform for the second wireless communication device to use to transmit a second plurality of RF signals to the first wireless communication device; and transmitting the second plurality of RF signals using the indicated waveform.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
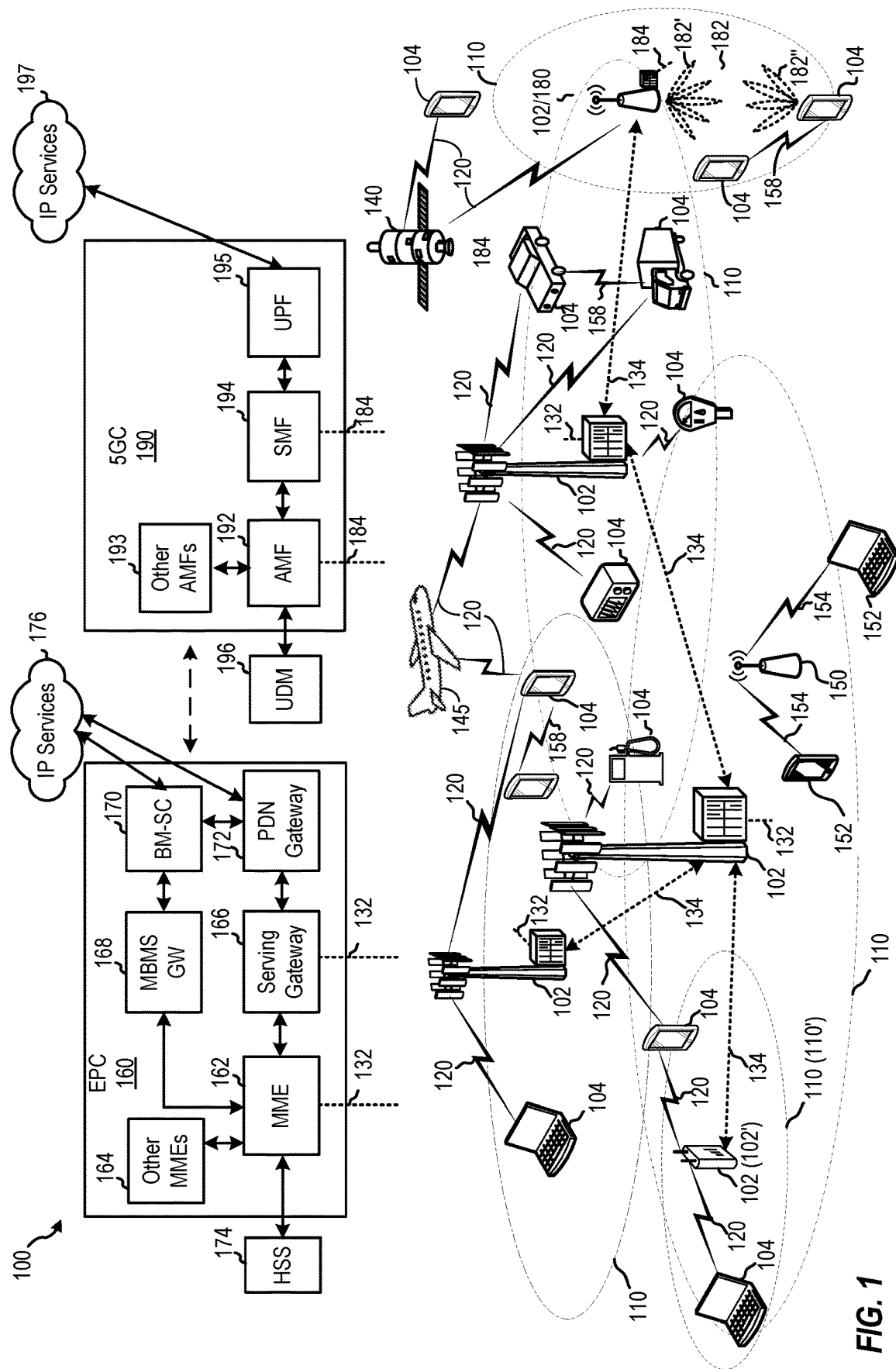
FIG. 1 depicts an example wireless communications network.

Aspects of the present disclosure provide apparatuses, methods, processing systems, and computer-readable mediums for load resistance signaling for wireless power transfer.

In some cases, certain devices known as wireless-powered internet of things (WP-IoT) devices may be capable of harvesting energy from one or more wireless energy sources, such as radio frequency (RF) signals, thermal energy, solar energy, etc. In some cases, when RF signals are used for energy harvesting in WP-IoT communication, a reader device may transmit an energy signal to a WP-IoT device. The WP-IoT device may then harvest energy from the energy signal (e.g., using energy harvesting circuitry) and use this harvested energy to power one or more other components of the WP-IoT device. After a sufficient amount of energy is accumulated, the WP-IoT device may begin to modulate the energy signal with transmission bits and transmit the energy signal back to the reader device, known as a backscatter signal or backscatter communication.

The energy harvesting circuitry includes a number of components for harvesting the energy from these energy signals, such as an antenna and a half-wave rectifier. The antenna is configured to wirelessly receive the energy signals, which may be sent as sinusoidal or alternating current RF waves. The half-wave rectifier is configured to convert these sinusoidal or alternating current RF waves into a direct current (DC) voltage, which may be used by the WP-IoT device to power one or more components (e.g., a microprocessor, memory, etc.). The one or more components powered by the received energy signals may have a particular resistance value, known as a load resistance ($R_L$).

In some cases, the RF-to-DC conversion described above may have an associated efficiency. RF-to-DC conversion efficiency is a measure of how effectively RF energy from the received RF waves is converted into DC energy by a device or system. It is typically expressed as a percentage and is calculated by dividing the DC power output by the RF power input. The higher the efficiency, the less energy is lost in the conversion process.

In some cases, this RF-to-DC conversion efficiency may depend on the load resistance value as well as they type of waveform of the received energy signals. For example, when an energy signal is transmitted using a multi-sine waveform (e.g., including multiple different sinusoid signals), this waveform may result in a particular RF-to-DC conversion efficiency depending on the load resistance value. In other words, for a given waveform, some load resistance values may result in poorer RF-to-DC conversion efficiencies and some load resistance values may result in higher RF-to-DC conversion efficiencies.

Because the RF-to-DC conversion efficiency for a particular waveform may depend on the load resistance value, there may be an ideal load resistance value that maximizes the RF-to-DC conversion efficiency for that particular waveform. However, when generating and transmitting the energy signals, the reader device (e.g., reader device) described above may not be aware of the load resistance value associated with the energy harvesting circuitry of the WP-IoT device. As such, in many cases, energy signals transmitted by the reader device may have a particular waveform that results in a poor RF-to-DC conversion efficiency at the WP-IoT device. Poor RF-to-DC conversion efficiency may, in some instances, result in the WP-IoT device not being able to harvest a sufficient amount of energy to power the one or more components, preventing the WP-IoT device from communicating with the reader device. Further, in some cases, the reader device may also unnecessarily repeat transmission of these energy signals, continually waiting for a reply from the WP-IoT device, resulting in wasted time, frequency, and power resources associated with these repeated transmissions.

Accordingly, aspects of the present disclosure provide techniques for improving RF-to-DC conversion efficiency associated with energy signals used for wireless power transfer. For example, in some cases, these techniques may involve the WP-IoT device transmitting information to the reader device indicating a waveform to use when transmitting RF signals to the WP-IoT device. In some cases, the information indicating the waveform may include, for example, a load resistance value of the WP-IoT device and an averaged input power associated with energy signals received at the WP-IoT device. For example, the load resistance value the averaged input power may be used to determine a waveform that improves RF-to-DC conversion efficiency of energy signals received by the WP-IoT device. Accordingly, improving RF-to-DC conversion efficiency of energy signals received by the WP-IoT device may help to ensure that the WP-IoT device is able to harvest a sufficient amount of energy from these energy signals in order to operate correctly (e.g., communicate, perform data processing, etc.) and avoid any wasted time, frequency, or power resources associated with retransmissions of energy signals, as described above.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
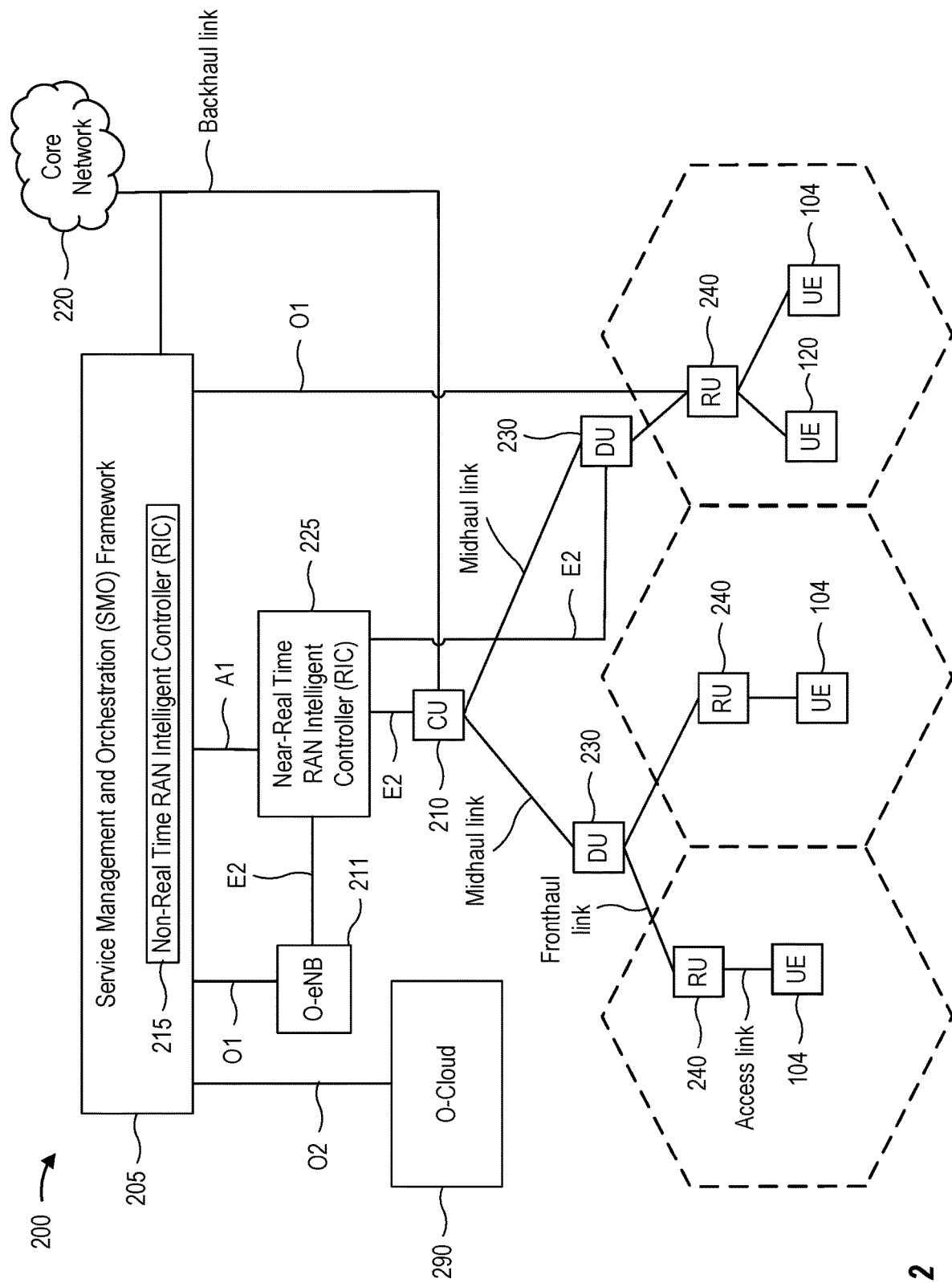
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
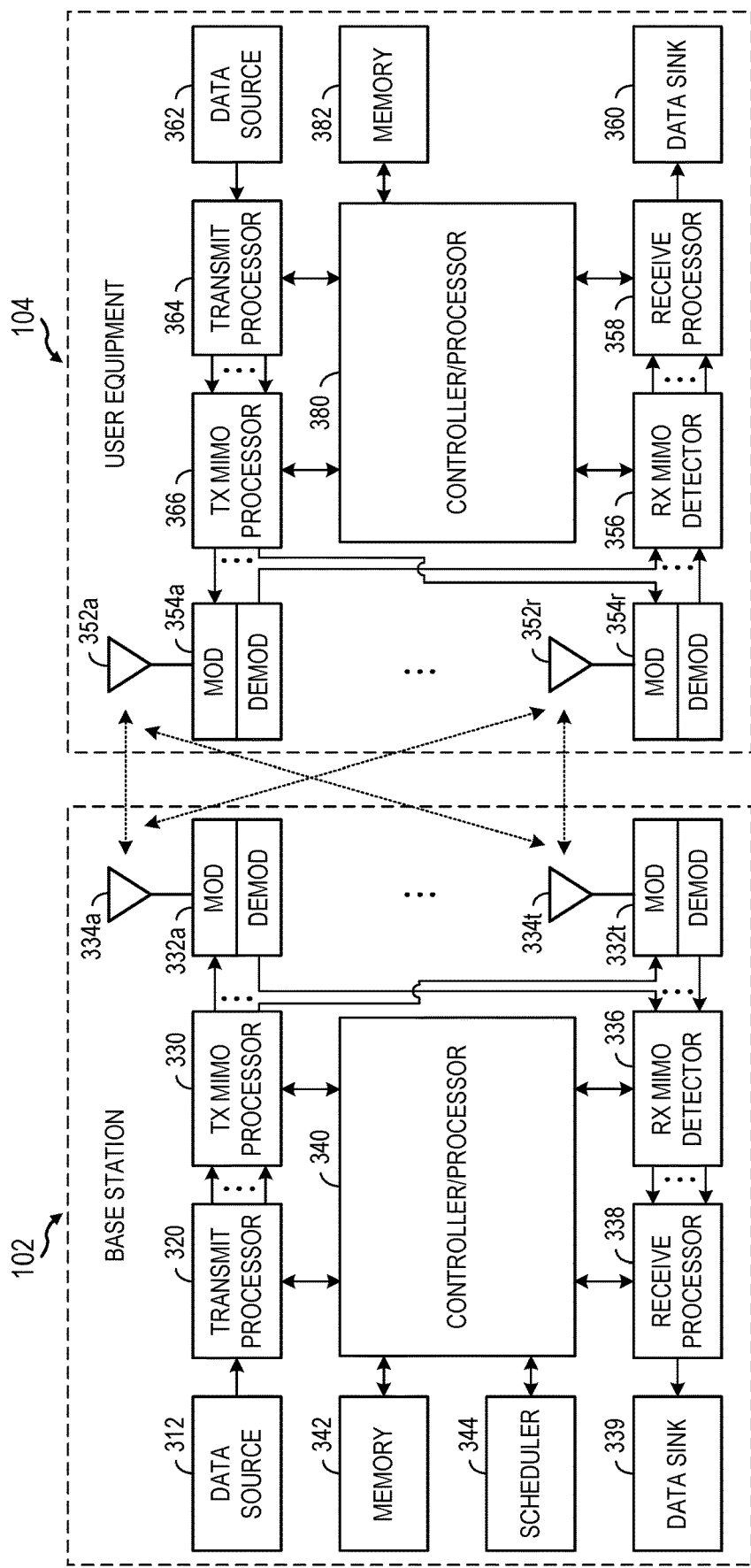
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Load Resistance Signaling for Wireless Power Transfer

Wireless technology is increasingly useful in industrial applications, such as ultra-reliable low-latency communication (URLLC) and machine type communication (MTC). In such domains, and others, it is desirable to support devices that are capable of harvesting energy from alternative energy sources (e.g., in lieu of or in combination with a battery or other energy storage device, such as a capacitor). For example, in some cases, these devices may not include a local power storage component and may instead harvest energy from things such as RF signals, thermal energy, solar energy, etc. In some cases, these devices may be known wireless-powered internet of things (WP-IoT) devices. WP-IoT devices may employ radio frequency identification (RFID)-type technology and, as such, may not include a local power source. Instead, WP-IoT devices may harvest energy from radio signals emitted from a reader device, such as a network entity or a user equipment (UE), for performing data collection, transmission and distributed computing.

Figure 5A:
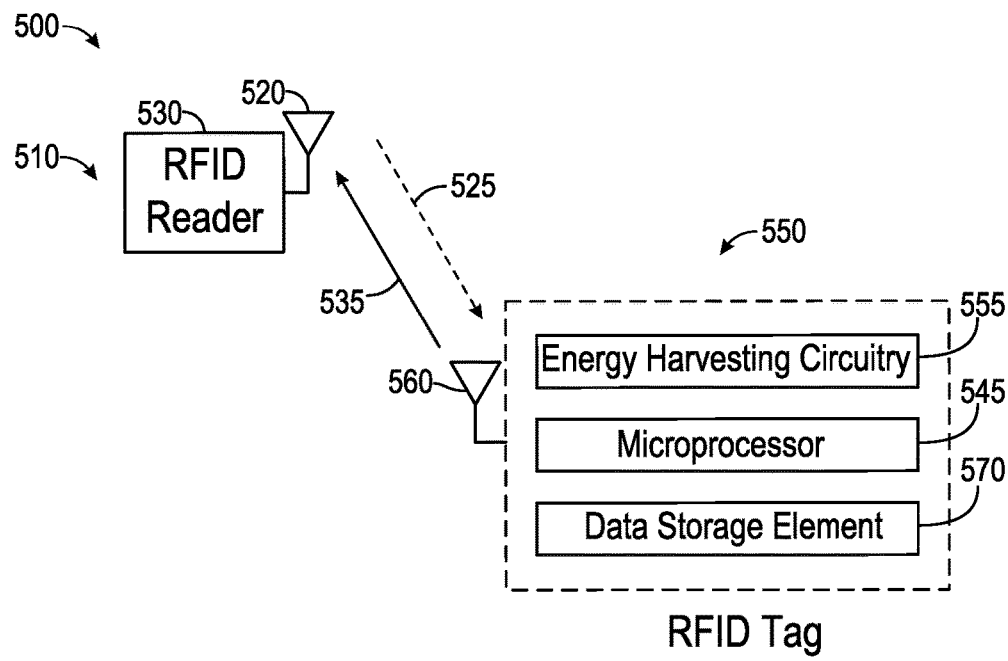
FIG. 5A illustrates a radio frequency identification (RFID) system.

FIG. 5A shows a wireless communication system 500 in which wireless power transfer is performed. As shown, the wireless communication system 500 includes a reader device 510 and a WP-IoT device 550. The reader device 510 may also be referred to as an interrogator or a scanner. In some cases, the reader device 510 may be an example of BS 102, a disaggregated BS as described with respect to FIG. 2, UE 104, or any other device described herein capable of transmitting wireless energy signals. In some cases, WP-IoT device 550 is an example of UE 104, a radio frequency identification (RFID) tag, or any other device described herein capable of receiving and harvesting energy from wireless energy signals.

The reader device 510 includes an antenna 520 and an electronics unit 530. The antenna 520 radiates signals for transmission by the reader device 510 and receives signals from RFID tags and/or other devices. The electronics unit 530 may include a transmitter and a receiver for wirelessly communicating with tag devices, such as the WP-IoT device 550. The same pair of transmitter and receiver (or another pair of transmitter and receiver) may support bi-directional communication with wireless networks, wireless devices, etc. The electronics unit 530 may include processing circuitry (e.g., a processor) to perform processing for data being transmitted and received by the reader device 510.

As shown, the WP-IoT device 550 includes an antenna 560 and a data storage element 570. The antenna 560 radiates signals for transmission by the WP-IoT device 550 and receives signals from the reader device 510 and/or other devices. The data storage element 570 stores information for the WP-IoT device 550, for example, in an electrically erasable programmable read-only memory (EEPROM) or another type of memory. The WP-IoT device 550 may also include an electronics unit that can process the received signal and generate the signals to be transmitted.

In some cases, the WP-IoT device 550 may be a passive WP-IoT device having no battery. In this case, the WP-IoT device 550 may communicate with the reader device 510 based on backscatter communication, which involves receiving energy signals from the reader device 510, modulating data on to these energy signals, and reflecting or transmitting these modulated signals (e.g., also known as backscatter signals) back to the reader device 510, as described below. In other cases, the WP-IoT device 550 may be an active WP-IoT device, including a battery. In this case, energy may be harvested from signals transmitted by the reader device 510 and stored in the battery, allowing the WP-IoT device 550 to accumulate more power to perform more advanced communication, such as transmission of uplink signals according to certain wireless communications standards (e.g., third generation partnership project (3GPP) standards, etc.). In either case, a magnetic field from a signal transmitted by reader device 510 may induce an electrical current in WP-IoT device 550, which may then operate based on the induced current. The WP-IoT device 550 can radiate its signal in response to receiving a signal from the reader device 510 or some other device.

In some cases, communication, based on wireless power transfer, between the reader device 510 and WP-IoT device 550 may occur as follows. For example, the reader device 510 may transmit/radiate a first signal 525 via the antenna 520. In some cases, the first signal 525 may be an RF signal and known as an interrogation signal or energy signal. In some cases, energy of the first signal 525 may be coupled from the antenna 520 of the reader device 510 to the antenna 560 of the WP-IoT device 550 via magnetic coupling and/or other phenomena. In other words, the WP-IoT device 550 may receive the first signal 525 from reader device 510 via antenna 560 and energy of the first signal 525 may be harvested using energy harvesting circuitry 555 and used to power the WP-IoT device 550.

For example, energy of the first signal 525 received by the WP-IoT device 550 may be used to power a microprocessor 545 of the WP-IoT device 550. The microprocessor 545 may, in turn, retrieve information stored in a data storage element 570 of the WP-IoT device 550 and transmit the retrieved information via a second signal 535 using the antenna 560. For example, in some cases, the microprocessor 545 may generate the second signal 535 by modulating a baseband signal (e.g., generated using energy of the first signal 525) with the information retrieved from the data storage element 570. In some cases, this second signal 535 may be known as a backscatter modulated information signal. Thereafter, as noted, microprocessor 545 transmits the second signal 535 to the reader device 510. The reader device 510 may receive the second signal 535 from the WP-IoT device 550 via antenna 520 and may process (e.g., demodulate) the received signal to obtain the information of the data storage element 570 sent in the second signal 535.

Figure 5B:
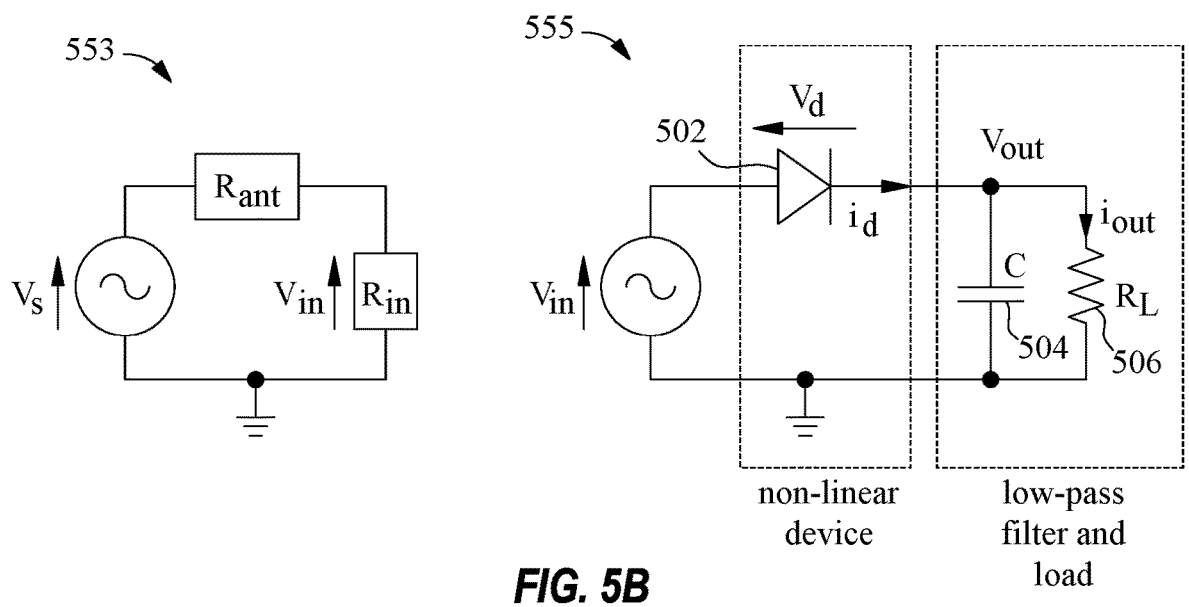
FIG. 5B illustrates an example topographies for circuitry of an RFID reader and for the energy harvesting circuitry.

FIG. 5B illustrates an example equivalent circuit 553 of the antenna 560 of the WP-IoT device 550 and an example topography of the energy harvesting circuitry 555 of the WP-IoT device 550. In some cases, as illustrated in the equivalent circuit 553 of the antenna 560, a lossless antenna may be modeled as an alternating current (AC) voltage source ($v_s(t)$) followed by a series antenna resistance ($R_{ant}$) of the antenna 560. In some cases, the voltage source ($v_s(t)$) may be based on an energy signal y (t)) received from the reader device 510. The equivalent circuit 553 of the antenna 560 also includes an input resistance ($R_{in}$) representing a resistance associated with the energy harvesting circuitry 555. In some cases, with perfect impedance matching, $R_{in}$ may equal $R_{ant}$.

As shown, the energy harvesting circuitry 555 comprises a half-wave rectifier circuit configured to convert an AC input power ($v_{in}$) (e.g., received via the antenna 560) into a direct current (DC) output power ($v_{out}$). Further, as shown, the energy harvesting circuitry 555 comprises a diode 502, a capacitor (C) 504, and a load resistance (Rx) 506. The load resistance 506 may represent a total resistance of one or more components of the WP-IoT device 550 that are powered by energy harvested by the energy harvesting circuitry 555. The diode 502 is configured to pass only one half of each complete sine wave of the AC voltage in order to convert it into the DC voltage. Further, as illustrated in the energy harvesting circuitry 555 in FIG. 5B, $i_d$ is a current of the diode 502 and $v_d$ is a voltage across the diode 502. In some cases, under perfect matching, $v_{in}(t)$ may be half of $v_s(t)$ and both can be related to the received signal energy signal (y (t)) at the energy harvesting circuitry 555 as $$v_s(t) = 2y(t)R_{ant}^{\frac{1}{2}} \text{ and } v_{in}(t) = y(t)R_{ant}^{\frac{1}{2}}.$$

The diode current $i_d$ may be expressed as $$i_d(t) = i_s\left(e^{\frac{v_d(t)}{nv_t}} - 1\right),$$

where $i_s$ is a reverse saturation current associated with the diode 502, $v_t$ is a thermal voltage associated with the diode 502, and n is a ideality factor associated with the diode 502. When averaged over time, the diode current $i_d$ may be expressed as $E\{i_d(t)\}=i_{out}$, where E is an expectation operation (e.g., an average). Further, as shown in Equation 1, below, Taylor's series expansion may be used to expand $$e^{\frac{v_d(t)}{nv_t}}$$

in the diode current $i_d$ expression, above, and shows the relationship between an output current $i_{out}$ and the input waveform or energy signal y(t).

$$e^{-\frac{R_L i_{out}}{nv_t}}(i_{out}+i_s) = i_s + \sum_{l=even}^{\infty} k'_l R_{ant}^{\frac{l}{2}} E\{y(t)^l\}, \text{ where } k'_l = \frac{i_s}{l! \, (nv_t)^l} \quad (1)$$

Figures 6A, 6B:
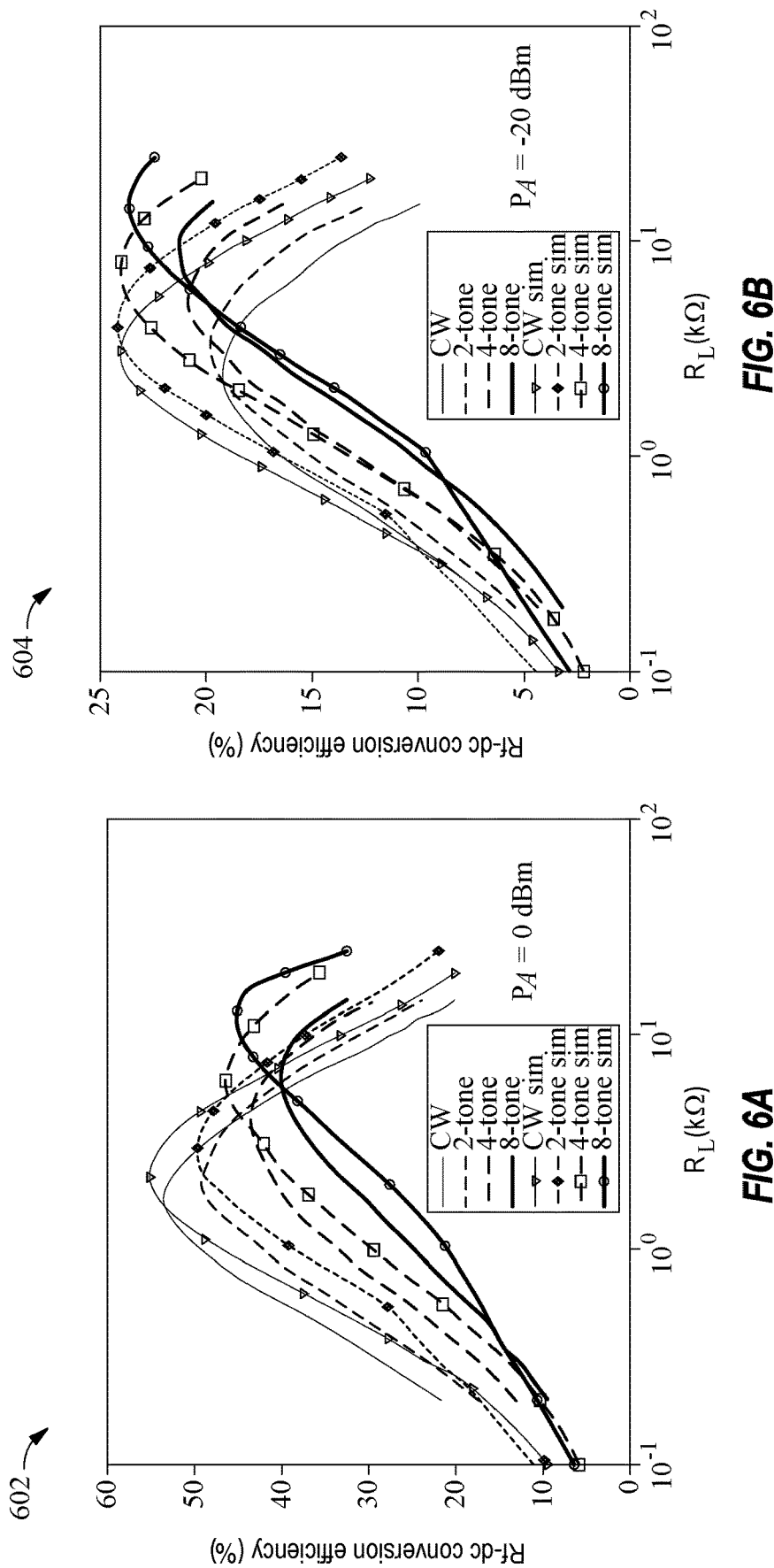
FIGS. 6A and 6B include graphs illustrating radio-frequency-to-direct-current conversion efficiencies for different load resistance values.

Accordingly, Equation 1 may be used to determine $i_{out}$ for a particular input waveform or energy signal y(t). Further, from the output current $i_{out}$, an efficiency of the energy harvesting circuitry 555 may be determined. For example, the efficiency of the energy harvesting circuitry 555 (e.g., the efficiency of converting an RF energy signal to direct current (DC) power) depends on the output current $i_{out}$ and, thus, depends on the load resistance ($R_L$), as shown in FIGS. 6A and 6B. As such, an efficiency of the energy harvesting circuitry 555 may be expressed as $$\eta = \frac{i_{out}^2 * RL}{P(y(t))},$$

where $i_{out}^2 * RL$ is the DC power associated with load resistance ($R_L$) and P(y(t)) is the input power associated energy signal y(t).

For example, FIG. 6A includes a first graph 602, illustrating RF-to-DC conversion efficiencies for different load resistance ($R_L$) values (e.g., in kilo-ohms, kΩ) associated with input signals (e.g., y(t)) having different numbers of tones and each having a first input power of $P_A$=0 dBm. Similarly, FIG. 6B includes a second graph 604, illustrating RF-to-DC conversion efficiencies for different load resistance ($R_L$) values (e.g., in kΩ associated with input signals (e.g., y (t)) having different numbers of tones and each having a second input power of $P_A$=−20 dBm.

As can be seen in the first graph 602 of FIG. 6A and the second graph 604 of FIG. 6B, the RF-to-DC conversion efficiency of the energy harvesting circuitry 555 depends on the load resistance ($R_L$) value. Further, as can be seen, there may be an optimal load resistance ($R_L$) value that maximizes the RF-to-DC conversion efficiency of the energy harvesting circuitry 555. Moreover, this optimal load resistance ($R_L$) value, in turn, depends on a waveform of the input signal. For example, in a multi-sine waveform, the optimal load resistance ($R_L$) value depends on a number of tones used to transmit the input signal to the energy harvesting circuitry 555. Additionally, as can be seen from the first graph 602 of FIG. 6A and the second graph 604 of FIG. 6B, the RF-to-DC conversion efficiency also depends on the input power PA of the input signals.

In some cases, the reader device 510 may not know what the load resistance ($R_L$) of the WP-IoT device 550 is. As a result, there may be cases in which an energy signal transmitted by the reader device 510 is not efficiently converted to DC power by the energy harvesting circuitry 555 of the WP-IoT device due to the dependencies between the RF-to-DC conversion efficiency and load resistance ($R_L$). For example, in some cases, an energy signal transmitted by the reader device 510 for energy harvesting by the WP-IoT device 550 may have a particular waveform (e.g., number of frequency tones) or input power ($P_A$) that is not ideal for the load resistance ($R_L$) of the WP-IoT device 550, resulting in poor RF-to-DC conversion efficiency associated with the energy signal.

In some cases, poor RF-to-DC conversion efficiency may result in energy signals not being able to effectively power the WP-IoT device 550, rendering the WP-IoT device 550 effectively useless. For example, if the WP-IoT device 550 is unable to convert a sufficient amount of power from energy signals received from the reader device 510, the WP-IoT device 550 may not be able to communicate with the reader device 510 or perform any sort of data processing. Moreover, if the WP-IoT device 550 is unable to communicate with the reader device 510 due to not being able to harvest a sufficient amount of energy, the reader device 510 may unnecessarily repeat transmission of these energy signals, continually waiting for a reply from the WP-IoT device 550, resulting in wasted time, frequency, and power resources associated with these repeated transmissions.

Accordingly, aspects of the present disclosure provide techniques for improving RF-to-DC conversion efficiency associated with energy signals transmitted from a reader device to a WP-IoT device. For example, in some cases, these techniques may involve transmitting energy signals to a WP-IoT device using a waveform that is based, at least in part, on a load resistance ($R_L$) of the WP-IoT device and an averaged input power associated with energy signals received by the WP-IoT device. For example, the load resistance ($R_L$) of the WP-IoT device and the averaged input power associated with energy signals received by the WP-IoT device may be used to determine a waveform that improves RF-to-DC conversion efficiency of energy signals received by the WP-IoT device. Accordingly, improving RF-to-DC conversion efficiency of energy signals received by the WP-IoT device may help to ensure that the WP-IoT device is able to harvest a sufficient amount of energy from these energy signals in order to operate correctly (e.g., communicate, perform data processing, etc.) and avoid any wasted time, frequency, or power resources associated with retransmissions of energy signals, as described above.

Example Operations of Entities in a Communications Network

Figure 7:
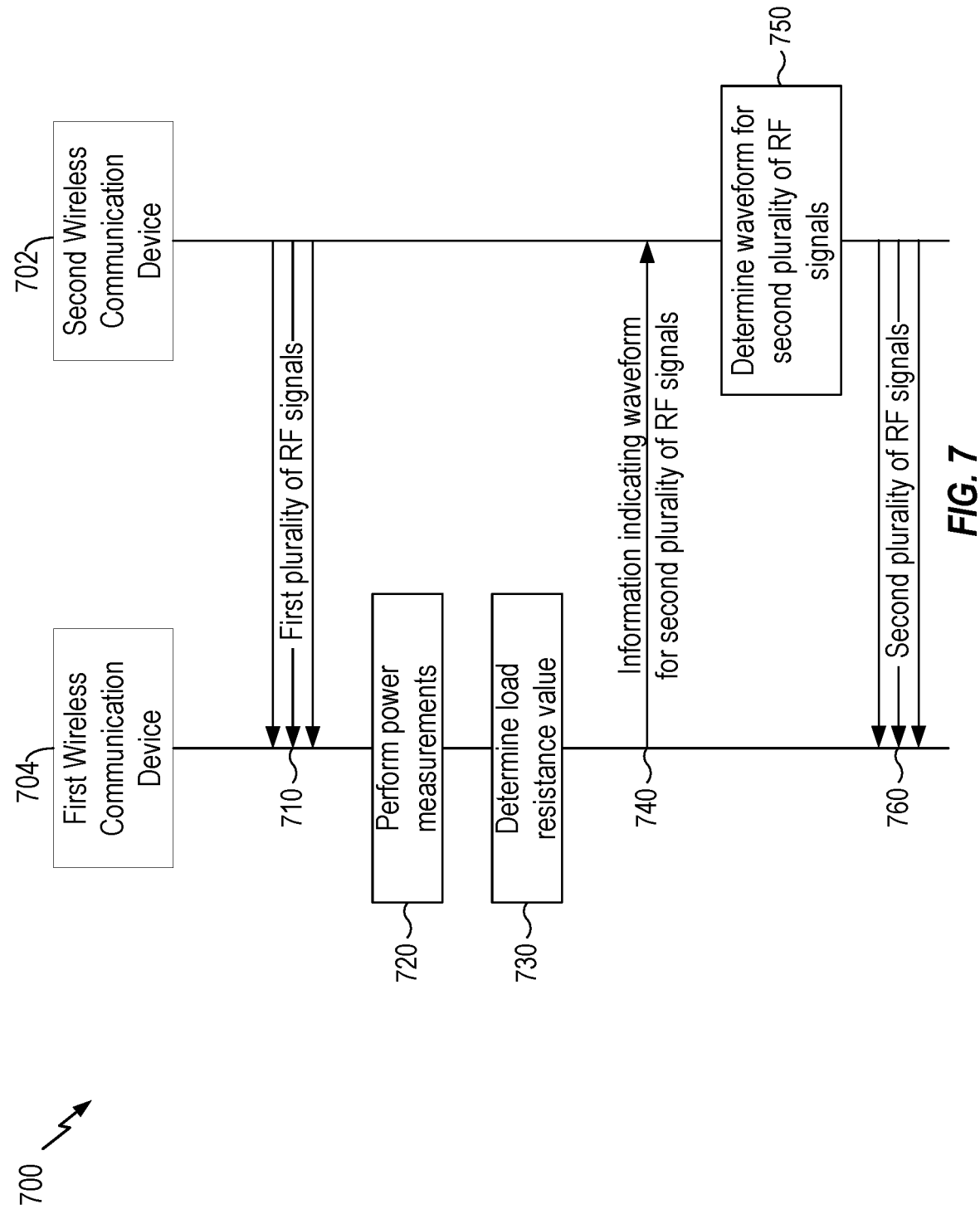
FIG. 7 depicts a process flow illustrating operations for communications in a network between a first wireless communication device and a second wireless communication device.

FIG. 7 depicts a process flow illustrating operations 700 for communications in a network between a first wireless communication device 704 and a second wireless communication device 702. In some aspects, first wireless communication device 704 may comprise a WP-IoT device, such as the WP-IoT device 550, UE 104, or any other device described herein capable of receiving and harvesting energy from wireless energy signals. In some aspects, the second wireless communication device 702 may comprise a reader device that is capable of WP-IoT communication (e.g., transmitting energy signals and receiving backscatter signals), such as BS 102 depicted and described with respect to FIGS. 1 and 3, a disaggregated base station depicted and described with respect to FIG. 2, and/or UE 104.

As shown, operations 700 begin in step 710 with the first wireless communication device 704 receiving, from the second wireless communication device 702, a first plurality radio frequency (RF) signals. In some cases, these RF signals may comprise energy signals that the first wireless communication device 704 may use to perform energy harvesting, for example, to harvest energy to power one or more components of the first wireless communication device 704. In some cases, the first plurality of RF signals may comprise a plurality of multi-tone RF signals.

In step 720, the first wireless communication device 704 performs power measurements associated with the first plurality of RF signals. For example, in some cases, the first wireless communication device 704 may measure an input power associated with the first plurality of RF signals and, based on the measurements, determine an average input power associated with the first plurality of RF signals. In some cases, performing the power measurements may include harvesting power from the first plurality of RF signals to power one or more components of the first wireless communication device 704, using techniques described above.

In step 730, the first wireless communication device 704 determines a load resistance value of the first wireless communication device 704. In some cases, the load resistance value may include a resistance value of the one or more components powered by the plurality of RF signals, such as a microprocessor (e.g., microprocessor 545 illustrated in FIG. 5A), a capacitor used for transmitting backscatter signals, a data storage element (e.g., data storage element 570 illustrated in FIG. 5A), and the like.

Thereafter, in step 740, the first wireless communication device 704 transmits, based in part on the power measurements performed in step 720, information indicating a waveform for the second wireless communication device 702 to use to transmit a second plurality of RF signals to the first wireless communication device 704. In some cases, the information indicating the waveform comprises the load resistance value and the average input power associated with the first plurality of RF signals.

In such cases, in step 750, the second wireless communication device 702 may determine the waveform for the second plurality of RF signals based on the load resistance value and the average input power associated with the plurality of RF signals received from the first wireless communication device. For example, in some cases, the second wireless communication device 702 may use a look up table that indicates the waveform for a given load resistance value and a given average input power. In some cases, the look up take may be determined experimentally or based on simulations.

In some cases, rather than transmitting the load resistance value and the average input power associated with the first plurality of RF signals to the second wireless communication device 702, the first wireless communication device 704 may, itself, determine the waveform based on the load resistance value and the average input power associated with the first plurality of RF signals (e.g., in some cases using a look up table, as described above). Accordingly, in such cases, the information indicating the waveform may comprise an explicit indication of the waveform (e.g., rather than including information for deriving the waveform, such as from the load resistance value and average input power). For example, in some cases, the information indicating the waveform may indicate a number of tones for the waveform and/or a frequency spacing between the tones.

In some cases, the first wireless communication device 704 may transmit the information indicating the waveform to the second wireless communication device 702 in different manners. For example, in some cases, the first wireless communication device 704 may modulate the information indicating the waveform onto one or more of the RF signals of the first plurality of RF signals to generate one or more backscatter transmissions. In such cases, transmitting the information indication the waveform in step 740 may include transmitting the one or more backscatter transmissions to the second wireless communication device 702.

In other cases, the first wireless communication device 704 may transmit the information indicating the waveform in one or more uplink transmissions (e.g., according to a wireless communication standard, such as a 3GPP wireless communication standard). For example, in some cases, the first wireless communication device 704 may be capable of generating a baseband signal and modulating the information indicating the waveform onto the baseband signal, which may then be transmitted to the second wireless communication device 702 as an uplink signal, for example, over a Uu interface.

Thereafter, as shown in step 760 in FIG. 7, the first wireless communication device 704 may receive the second plurality of RF signals having the indicated waveform. In some cases, a waveform of the first plurality of RF signals is different from the waveform of the second plurality of RF signals. For example, in some cases, the waveform of the second plurality of RF signals may include a different number of tones or a different tone spacing as compared to the first plurality of RF signals that results in improved RF-to-DC conversion efficiency. For example, the waveform of the second plurality of signals may result in an RF-to-DC conversion efficiency, associated with harvesting power from the second plurality of RF signals, that is greater that an RF-to-DC conversion efficiency associated with harvesting power from the first plurality of RF signals Additional Details Regarding Load Resistance Signaling for Wireless Power Transfer In some cases, the first wireless communication device 704 may include a variable load resistor, which may be implemented using parallel metal oxide silicon field-effect transistors (MOSFETs) and switch control. In this case, the first wireless communication device 704 may be able to adjust the load resistance value in order to improve RF-to-DC conversion efficiency based on the waveform of the first plurality of RF signals transmitted by the second wireless communication device 702.

For example, in some cases, the second wireless communication device 702 may transmit information indicating the waveform for the first plurality of RF signals to the first wireless communication device 704. Thereafter, the first wireless communication device 704 may receive the first plurality of RF signals from the second wireless communication device 702. Additionally, the first wireless communication device 704 may also perform power measurements associated with the first plurality of RF signals and determine, based on the power measurements, an average input power associated with the first plurality of RF signals. Thereafter, based on the information indicating the waveform of the first plurality of RF signals and the average input power associated with the first plurality of RF signals, the first wireless communication device 704 may adjust the load resistance value associated with the variable load resistor in order to improve the RF-to-DC conversion efficiency associated with harvesting energy from the first plurality of RF signals.

In some cases, rather than signaling the load resistance value and average input power to the second wireless communication device 702, the first wireless communication device 704 may perform measurements on different RF signals transmitted with different waveforms and may select the waveform of the RF signals that have an RF-to-DC conversion efficiency above a certain threshold.

For example, in some cases, the second wireless communication device 702 may be configured to transmit a plurality of RF signals, each having a different waveform (e.g., number of frequency tones and/or tone spacings), at particular intervals. The first wireless communication device 704 may be configured to perform RF-to-DC conversion efficiency measurements for each of the RF signals transmitted with the different waveforms. For example, in some cases, the first wireless communication device 704 may measure a first input power associated with a first RF signal and may measure a corresponding first DC output power after RF-to-DC conversion. The first wireless communication device 704 may then determine a first RF-to-DC conversion efficiency by dividing the first DC output power by the first input power associated. The first wireless communication device 704 may then repeat these RF-to-DC conversion efficiency measurements for all remaining RF signals in the plurality of RF signals.

Thereafter, the first wireless communication device 704 may select, based on the RF-to-DC conversion efficiency measurements, the RF signal and corresponding waveform that results in an RF-to-DC conversion efficiency greater than or equal to a certain threshold. The first wireless communication device 704 may then transmit information indicating the selected waveform/RF signal to the second wireless communication device 702, for example, using one or more backscatter transmissions or one or more uplink transmissions.

In some cases, rather than selecting a waveform itself, the first wireless communication device 704 may instead transmit, to the second wireless communication device 702, a plurality of DC output powers measured by the first wireless communication device 704. For example, as described above, the second wireless communication device 702 may be configured to transmit a plurality of RF signals, each having a different waveform at particular intervals. The first wireless communication device 704 may be configured to perform DC output power measurements (e.g., DC power after energy harvesting) for each of the RF signals transmitted with the different waveforms. The first wireless communication device 704 may then transmit these DC output power measurements to the second wireless communication device 702, which may then determine RF-to-DC conversion efficiencies based on transmission powers that were used to transmit the plurality of RF signals. The second wireless communication device 702 may then select the RF signal and corresponding waveform that resulted in the highest RF-to-DC conversion efficiency. Thereafter, the second wireless communication device 702 may then use the selected waveform to transmit additional RF signals to the first wireless communication device 704.

While the techniques presented above are described with respect to a load resistance (e.g., $R_L$, as described with respect to FIGS. 5A and 5B), these techniques may also be used with respect to an antenna resistance (e.g., $R_{ant}$, as described with respect to FIGS. 5A and 5B). In other words, in addition to or alternatively, the first wireless communication device 704 may transmit an antenna resistance value to the second wireless communication device 702, which may then be used to determine the waveform for the second plurality of RF signals. Similarly, the first wireless communication device 704 may also directly determine the waveform, itself, based on the antenna resistance value (and, in some cases, the load resistance value and average input power).

Example Operations of a First Wireless Communication Device

Figure 8:
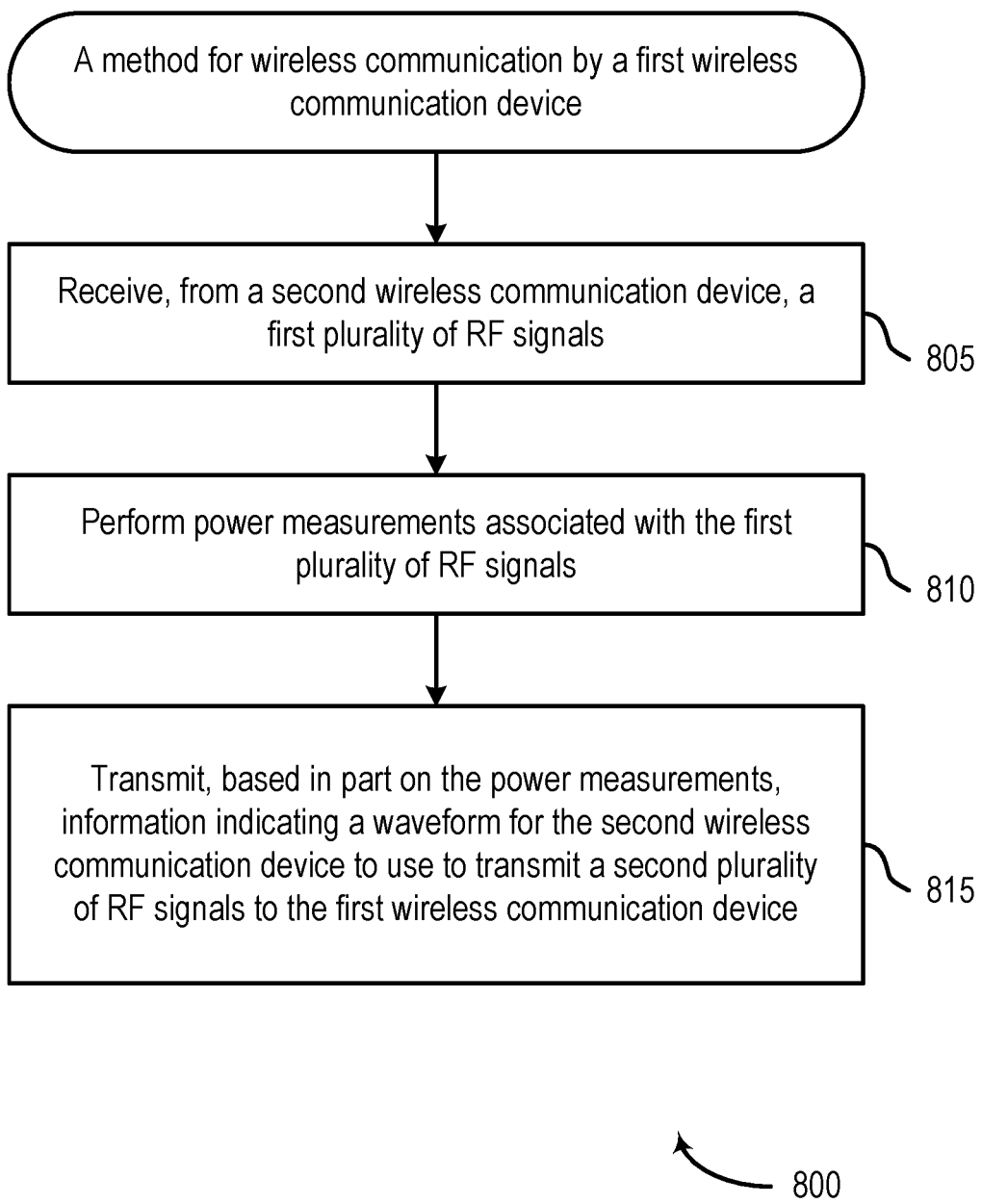
FIG. 8 depicts a method for wireless communications.

FIG. 8 shows an example of a method 800 of wireless communication by a first wireless communication device. The first wireless communication device may be a WP-IoT device, such as the WP-IoT device 550, UE 104, or any other device described herein capable of WP-IoT communication (e.g., receiving and harvesting energy from wireless energy signals).

Method 800 begins at step 805 with receiving, from a second wireless communication device, a first plurality of RF signals. In some cases, the operations of this step refer to, or may be performed by, circuitry for receiving and/or code for receiving as described with reference to FIG. 10.

Method 800 then proceeds to step 810 with performing power measurements associated with the first plurality of RF signals. In some cases, the operations of this step refer to, or may be performed by, circuitry for performing and/or code for performing as described with reference to FIG. 10.

Method 800 then proceeds to step 815 with transmitting, based in part on the power measurements, information indicating a waveform for the second wireless communication device to use to transmit a second plurality of RF signals to the first wireless communication device. In some cases, the operations of this step refer to, or may be performed by, circuitry for transmitting and/or code for transmitting as described with reference to FIG. 10.

In some aspects, the method 800 further includes determining a load resistance value of the first wireless communication device. In some cases, the operations of this step refer to, or may be performed by, circuitry for determining and/or code for determining as described with reference to FIG. 10.

In some aspects, the method 800 further includes determining, based on the power measurements, an average input power associated with the first plurality of RF signals. In some cases, the operations of this step refer to, or may be performed by, circuitry for determining and/or code for determining as described with reference to FIG. 10.

In some aspects, the load resistance value is pre-configured in memory of the first wireless communication device.

In some aspects, the method 800 further includes harvesting power from the first plurality of RF signals to power one or more components of the first wireless communication device. In some cases, the operations of this step refer to, or may be performed by, circuitry for harvesting and/or code for harvesting as described with reference to FIG. 10.

In some aspects, the load resistance value comprises a resistance value of the one or more components powered by the first plurality of RF signals.

In some aspects, the information indicating the waveform comprises the load resistance value and the average input power associated with the first plurality of RF signals.

In some aspects, the method 800 further includes determining the waveform based on the load resistance value and the average input power associated with the first plurality of RF signals. In some cases, the operations of this step refer to, or may be performed by, circuitry for determining and/or code for determining as described with reference to FIG. 10.

In some aspects, the information indicating the waveform comprises information indicating at least one of a number of tones for the waveform or a frequency spacing between tones.

In some aspects, transmitting the information indicating the waveform comprises: modulating the information indicating the waveform onto one or more of the RF signals of the first plurality of RF signals to generate one or more backscatter transmissions; and transmitting the one or more backscatter transmissions to the second wireless communication device.

In some aspects, transmitting the information indicating the waveform comprising transmitting the information indicating the waveform in one or more uplink transmissions.

In some aspects, the first plurality of RF signals comprise a plurality of multi-tone RF signals.

In some aspects, the method 800 further includes receiving the second plurality of RF signals having the indicated waveform. In some cases, the operations of this step refer to, or may be performed by, circuitry for receiving and/or code for receiving as described with reference to FIG. 10.

In some aspects, a waveform of the first plurality of RF signals is different from the waveform of the second plurality of RF signals.

In some aspects, an RF-to-DC conversion efficiency associated with harvesting power from the second plurality of RF signals is greater that an RF-to-DC conversion efficiency associated with harvesting power from the first plurality of RF signals.

Figure 10:
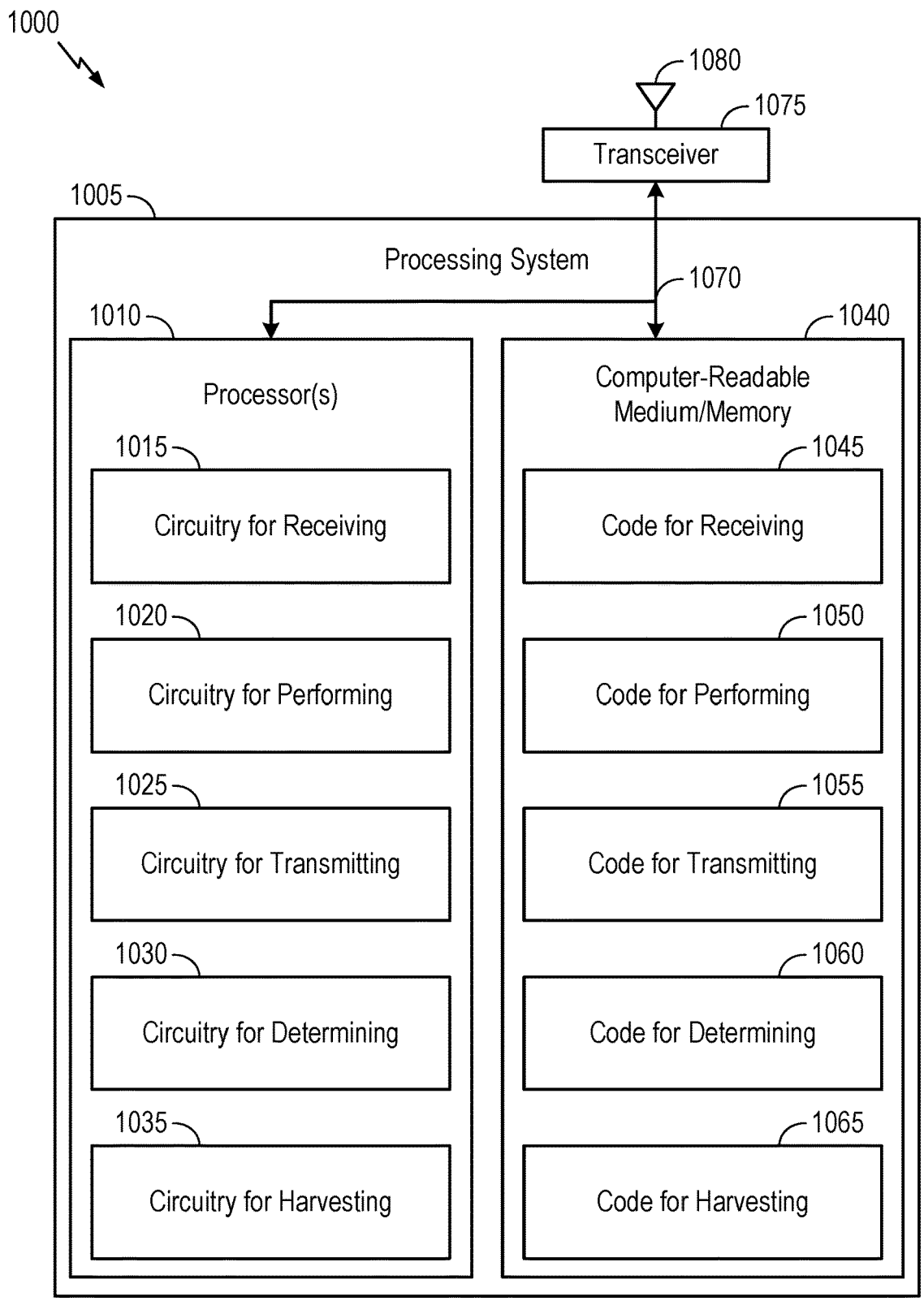
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations of a Second Wireless Communication Device

Figure 9:
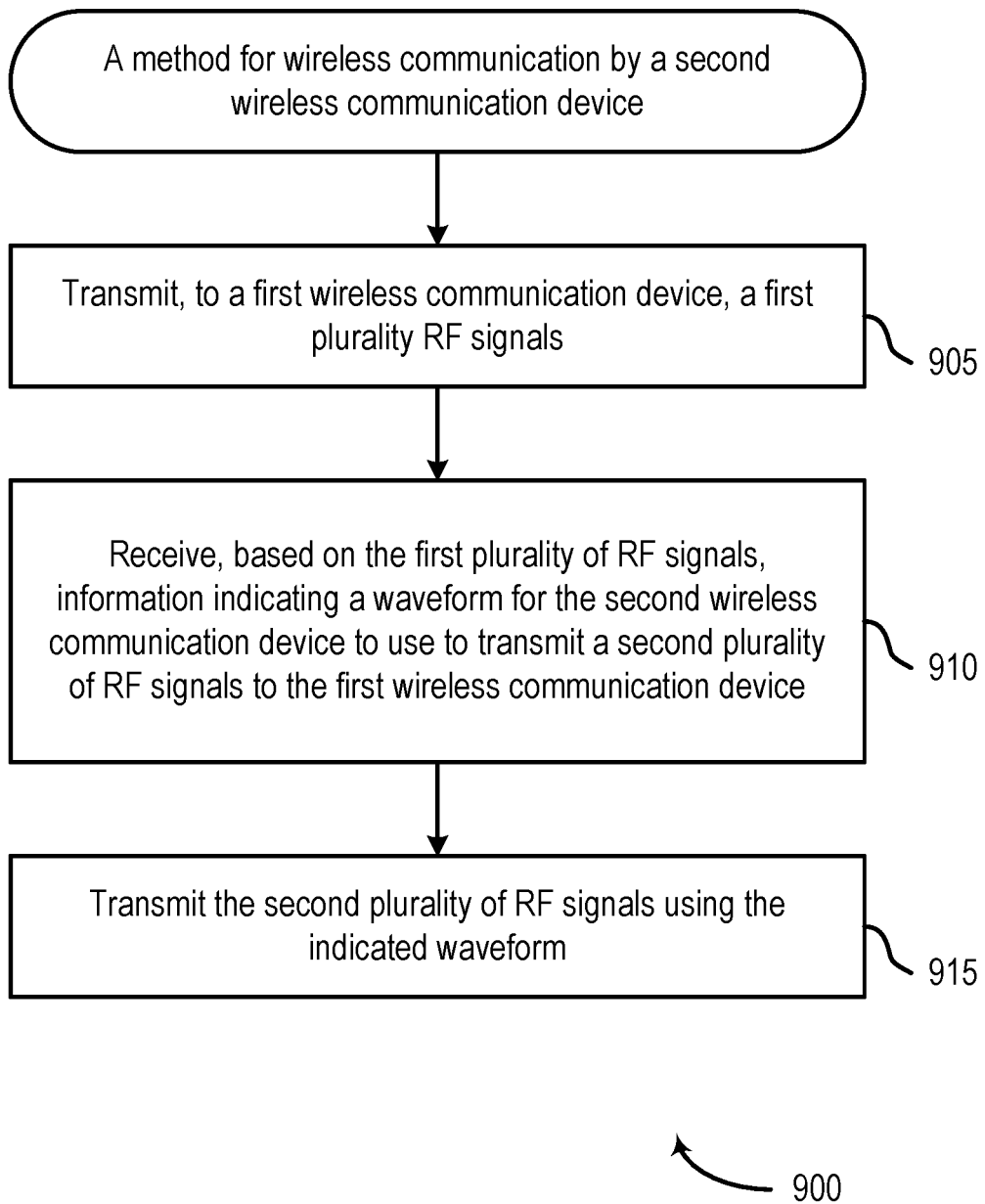
FIG. 9 depicts a method for wireless communications.

FIG. 9 shows an example of a method 900 of wireless communication by a second wireless communication device. The second wireless communication device may comprise a reader device that is capable of WP-IoT communication (e.g., transmitting energy signals), such as reader device 510, BS 102, or disaggregated base station depicted and described with respect to FIG. 2.

Method 900 begins at step 905 with transmitting, to a first wireless communication device, a first plurality RF signals. In some cases, the operations of this step refer to, or may be performed by, circuitry for transmitting and/or code for transmitting as described with reference to FIG. 11.

Method 900 then proceeds to step 910 with receiving, based on the first plurality of RF signals, information indicating a waveform for the second wireless communication device to use to transmit a second plurality of RF signals to the first wireless communication device. In some cases, the operations of this step refer to, or may be performed by, circuitry for receiving and/or code for receiving as described with reference to FIG. 11.

Method 900 then proceeds to step 915 with transmitting the second plurality of RF signals using the indicated waveform. In some cases, the operations of this step refer to, or may be performed by, circuitry for transmitting and/or code for transmitting as described with reference to FIG. 11.

In some aspects, the information indicating the waveform comprises: a load resistance value of the first wireless communication device; and an average input power at the first wireless communication device associated with the first plurality of RF signals.

In some aspects, the method 900 further includes determining the waveform based on the load resistance value and the average input power associated with the first plurality of RF signals. In some cases, the operations of this step refer to, or may be performed by, circuitry for determining and/or code for determining as described with reference to FIG. 11.

In some aspects, the information indicating the waveform comprises information indicating at least one of a number of tones for the waveform or a frequency spacing between tones.

In some aspects, receiving the information indicating the waveform comprises receiving one or more backscatter transmissions, from the first wireless communication device, having the information indicating the waveform modulated thereon.

In some aspects, receiving the information indicating the waveform comprises receiving the information indicating the waveform in one or more uplink transmissions.

In some aspects, the first plurality of RF signals comprise a plurality of multi-tone RF signals.

In some aspects, a waveform of the first plurality of RF signals is different from the waveform of the second plurality of RF signals.

Figure 11:
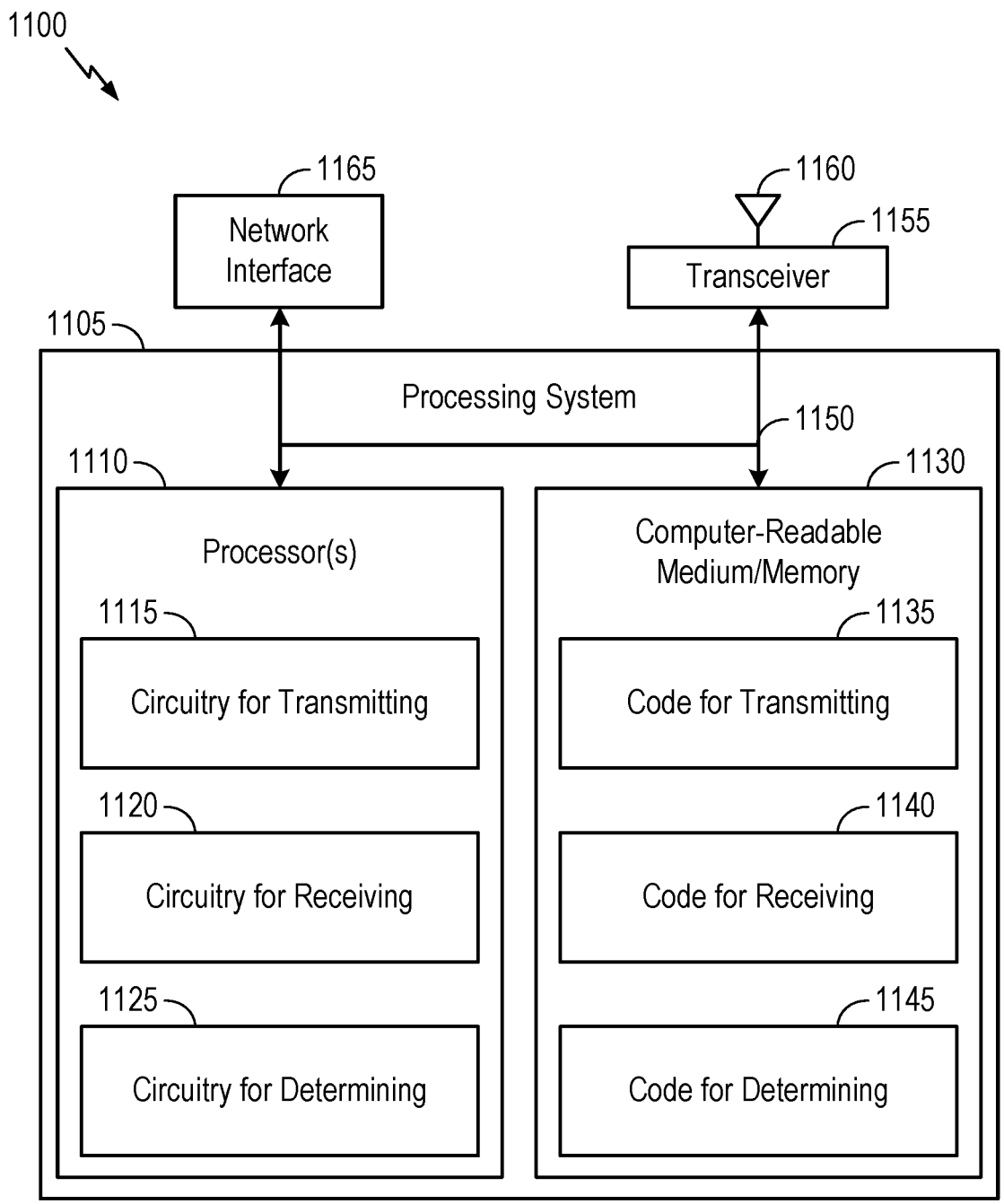
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Devices

FIG. 10 depicts aspects of an example communications device 1000. In some aspects, communications device 1000 is a WP-IoT device, such as the WP-IoT device 550, UE 104, or any other device described herein capable of WP-IoT communication (e.g., receiving and harvesting energy from wireless energy signals).

The communications device 1000 includes a processing system 1005 coupled to the transceiver 1075 (e.g., a transmitter and/or a receiver). The transceiver 1075 is configured to transmit and receive signals for the communications device 1000 via the antenna 1080, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1040 via a bus 1070. In certain aspects, the computer-readable medium/memory 1040 is configured to store instructions (e.g., computer-executable code) that when executed by the one or more processors 1010, cause the one or more processors 1010 to perform the method 800 described with respect to FIG. 8, or any aspect related to it. Note that reference to a processor performing a function of communications device 1000 may include one or more processors 1010 performing that function of communications device 1000.

In the depicted example, computer-readable medium/memory 1040 stores code (e.g., executable instructions), such as code for receiving 1045, code for performing 1050, code for transmitting 1055, code for determining 1060, and code for harvesting 1065. Processing of the code for receiving 1045, code for performing 1050, code for transmitting 1055, code for determining 1060, and code for harvesting 1065 may cause the communications device 1000 to perform the method 800 described with respect to FIG. 8, or any aspect related to it.

The one or more processors 1010 include circuitry configured to implement (e.g., execute) the code stored in the computer-readable medium/memory 1040, including circuitry such as circuitry for receiving 1015, circuitry for performing 1020, circuitry for transmitting 1025, circuitry for determining 1030, and circuitry for harvesting 1035. Processing with circuitry for receiving 1015, circuitry for performing 1020, circuitry for transmitting 1025, circuitry for determining 1030, and circuitry for harvesting 1035 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1075 and the antenna 1080 of the communications device 1000 in FIG. 10. Means for receiving or obtaining may include transceivers 354 and/or antenna(s) 352 of the UE 104 illustrated in FIG. 3 and/or the transceiver 1075 and the antenna 1080 of the communications device 1000 in FIG. 10.

FIG. 11 depicts aspects of an example communications device 1100. In some aspects, communications device 1100 is a network entity or reader device that is capable of WP-IoT communication (e.g., transmitting energy signals), such as reader device 510, BS 102, or a disaggregated base station depicted and described with respect to FIG. 2.

The communications device 1100 includes a processing system 1105 coupled to the transceiver 1155 (e.g., a transmitter and/or a receiver) and/or a network interface 1165. The transceiver 1155 is configured to transmit and receive signals for the communications device 1100 via the antenna 1160, such as the various signals as described herein. The network interface 1165 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1130 via a bus 1150. In certain aspects, the computer-readable medium/memory 1130 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1130 stores code (e.g., executable instructions), such as code for transmitting 1135, code for receiving 1140, and code for determining 1145. Processing of the code for transmitting 1135, code for receiving 1140, and code for determining 1145 may cause the communications device 1100 to perform the method 900 described with respect to FIG. 9, or any aspect related to it.

The one or more processors 1110 include circuitry configured to implement (e.g., execute) the code stored in the computer-readable medium/memory 1130, including circuitry such as circuitry for transmitting 1115, circuitry for receiving 1120, and circuitry for determining 1125. Processing with circuitry for transmitting 1115, circuitry for receiving 1120, and circuitry for determining 1125 may cause the communications device 1100 to perform the method 900 described with respect to FIG. 9, or any aspect related to it.

Various components of the communications device 1100 may provide means for performing the method 900 described with respect to FIG. 9, or any aspect related to it. Means for transmitting, sending or outputting for transmission may include transceivers 332 and/or antenna(s) 334 of the BS 102 illustrated in FIG. 3 and/or the transceiver 1155 and the antenna 1160 of the communications device 1100 in FIG. 11. Means for receiving or obtaining may include transceivers 332 and/or antenna(s) 334 of the BS 102 illustrated in FIG. 3 and/or the transceiver 1155 and the antenna 1160 of the communications device 1100 in FIG. 11.

Example Clauses

Implementation examples are described in the following numbered clauses:

Clause 1: A method for wireless communication by a first wireless communication device, comprising: receiving, from a second wireless communication device, a first plurality of RF signals; performing power measurements associated with the first plurality of RF signals; and transmitting, based in part on the power measurements, information indicating a waveform for the second wireless communication device to use to transmit a second plurality of RF signals to the first wireless communication device.

Clause 2: The method of Clause 1, further comprising: determining a load resistance value of the first wireless communication device; and determining, based on the power measurements, an average input power associated with the first plurality of RF signals.

Clause 3: The method of Clause 2, wherein the load resistance value is pre-configured in memory of the first wireless communication device.

Clause 4: The method of Clause 2, further comprising harvesting power from the first plurality of RF signals to power one or more components of the first wireless communication device.

Clause 5: The method of Clause 4, wherein the load resistance value comprises a resistance value of the one or more components powered by the first plurality of RF signals.

Clause 6: The method of Clause 2, wherein the information indicating the waveform comprises the load resistance value and the average input power associated with the first plurality of RF signals.

Clause 7: The method of Clause 2, further comprising determining the waveform based on the load resistance value and the average input power associated with the first plurality of RF signals.

Clause 8: The method of Clause 7, wherein the information indicating the waveform comprises information indicating at least one of a number of tones for the waveform or a frequency spacing between tones.

Clause 9: The method of any one of Clauses 1-8, wherein transmitting the information indicating the waveform comprises: modulating the information indicating the waveform onto one or more of the RF signals of the first plurality of RF signals to generate one or more backscatter transmissions; and transmitting the one or more backscatter transmissions to the second wireless communication device.

Clause 10: The method of any one of Clauses 1-9, wherein transmitting the information indicating the waveform comprising transmitting the information indicating the waveform in one or more uplink transmissions.

Clause 11: The method of any one of Clauses 1-10, wherein the first plurality of RF signals comprise a plurality of multi-tone RF signals.

Clause 12: The method of any one of Clauses 1-11, further comprising receiving the second plurality of RF signals having the indicated waveform.

Clause 13: The method of Clause 12, wherein a waveform of the first plurality of RF signals is different from the waveform of the second plurality of RF signals.

Clause 14: The method of any one of Clauses 1-13, wherein an RF-to-DC conversion efficiency associated with harvesting power from the second plurality of RF signals is greater that an RF-to-DC conversion efficiency associated with harvesting power from the first plurality of RF signals.

Clause 15: A method for wireless communication by a second wireless communication device, comprising: transmitting, to a first wireless communication device, a first plurality RF signals; receiving, based on the first plurality of RF signals, information indicating a waveform for the second wireless communication device to use to transmit a second plurality of RF signals to the first wireless communication device; and transmitting the second plurality of RF signals using the indicated waveform.

Clause 16: The method of Clause 15, wherein the information indicating the waveform comprises: a load resistance value of the first wireless communication device; and an average input power at the first wireless communication device associated with the first plurality of RF signals.

Clause 17: The method of Clause 16, further comprising determining the waveform based on the load resistance value and the average input power associated with the first plurality of RF signals.

Clause 18: The method of any one of Clauses 15-17, wherein the information indicating the waveform comprises information indicating at least one of a number of tones for the waveform or a frequency spacing between tones.

Clause 19: The method of any one of Clauses 15-18, wherein receiving the information indicating the waveform comprises receiving one or more backscatter transmissions, from the first wireless communication device, having the information indicating the waveform modulated thereon.

Clause 20: The method of any one of Clauses 15-19, wherein receiving the information indicating the waveform comprises receiving the information indicating the waveform in one or more uplink transmissions.

Clause 21: The method of any one of Clauses 15-20, wherein the first plurality of RF signals comprise a plurality of multi-tone RF signals.

Clause 22: The method of any one of Clauses 15-21, wherein a waveform of the first plurality of RF signals is different from the waveform of the second plurality of RF signals.

Clause 23: An apparatus, comprising: a memory comprising executable instructions; and a processor configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by a processor of an apparatus, cause the apparatus to perform a method in accordance with any one of Clauses 1-22.

Clause 26: A computer program product embodied on a computer-readable storage medium comprising code for performing a method in accordance with any one of Clauses 1-22.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first wireless communication device, comprising:
   receiving, from a second wireless communication device, a first plurality radio frequency (RF) signals;
   performing power measurements associated with the first plurality of RF signals;
   determining a load resistance value of the first wireless communication device;
   determining, based on the power measurements, an average input power associated with the first plurality of RF signals; and
   transmitting, based in part on the power measurements, information indicating a waveform for the second wireless communication device to use to transmit a second plurality of RF signals to the first wireless communication device, wherein the information indicating the waveform comprises the load resistance value and the average input power associated with the first plurality of RF signals.

2. The method of claim 1, wherein the load resistance value is pre-configured in memory of the first wireless communication device.

3. The method of claim 1, further comprising harvesting power from the first plurality of RF signals to power one or more components of the first wireless communication device.

4. The method of claim 3, wherein the load resistance value comprises a resistance value of the one or more components powered by the first plurality of RF signals.

5. The method of claim 1, further comprising determining the waveform based on the load resistance value and the average input power associated with the first plurality of RF signals.

6. The method of claim 5, wherein the information indicating the waveform comprises information indicating at least one of a number of tones for the waveform or a frequency spacing between tones.

7. The method of claim 1, wherein transmitting the information indicating the waveform comprises:
   modulating the information indicating the waveform onto one or more of the RF signals of the first plurality of RF signals to generate one or more backscatter transmissions; and
   transmitting the one or more backscatter transmissions to the second wireless communication device.

8. The method of claim 1, wherein transmitting the information indicating the waveform comprising transmitting the information indicating the waveform in one or more uplink transmissions.

9. The method of claim 1, wherein the first plurality of RF signals comprise a plurality of multi-tone RF signals.

10. The method of claim 1, further comprising receiving the second plurality of RF signals having the indicated waveform.

11. The method of claim 10, wherein a waveform of the first plurality of RF signals is different from the waveform of the second plurality of RF signals.

12. The method of claim 1, wherein an RF-to-direct-current (DC) conversion efficiency associated with harvesting power from the second plurality of RF signals is greater that an RF-to-DC conversion efficiency associated with harvesting power from the first plurality of RF signals.

13. A method for wireless communication by a second wireless communication device, comprising:
transmitting, to a first wireless communication device, a first plurality radio frequency (RF) signals; and
receiving, based on the first plurality of RF signals, information indicating a waveform for the second wireless communication device to use to transmit a second plurality of RF signals to the first wireless communication device, wherein the information indicating the waveform comprises:
a load resistance value of the first wireless communication device; and
an average input power at the first wireless communication device associated with the first plurality of RF signals; and
transmitting the second plurality of RF signals using the indicated waveform.

14. The method of claim 13, further comprising determining the waveform based on the load resistance value and the average input power associated with the first plurality of RF signals.

15. The method of claim 13, wherein the information indicating the waveform comprises information indicating at least one of a number of tones for the waveform or a frequency spacing between tones.

16. The method of claim 13, wherein receiving the information indicating the waveform comprises receiving one or more backscatter transmissions, from the first wireless communication device, having the information indicating the waveform modulated thereon.

17. The method of claim 13, wherein receiving the information indicating the waveform comprises receiving the information indicating the waveform in one or more uplink transmissions.

18. The method of claim 13, wherein the first plurality of RF signals comprise a plurality of multi-tone RF signals.

19. The method of claim 13, wherein a waveform of the first plurality of RF signals is different from the waveform of the second plurality of RF signals.

20. A first wireless communication device, comprising:
one or more processors configured to execute instructions stored in one or more memories to cause the first wireless communication device to:
receive, from a second wireless communication device, a first plurality radio frequency (RF) signals;
perform power measurements associated with the first plurality of RF signals;
determine a load resistance value of the first wireless communication device;
determine, based on the power measurements, an average input power associated with the first plurality of RF signals; and
transmit, based in part on the power measurements, information indicating a waveform for the second wireless communication device to use to transmit a second plurality of RF signals to the first wireless communication device, wherein the information indicating the waveform comprises the load resistance value and the average input power associated with the first plurality of RF signals.

21. The first wireless communication device of claim 20, wherein:
the one or more processors are further configured to cause the first wireless communication device to receive the second plurality of RF signals having the indicated waveform; and
a waveform of the first plurality of RF signals is different from the waveform of the second plurality of RF signals.

22. The first wireless communication device of claim 20, wherein an RF-to-direct-current (DC) conversion efficiency associated with harvesting power from the second plurality of RF signals is greater that an RF-to-DC conversion efficiency associated with harvesting power from the first plurality of RF signals.

23. A second wireless communication device, comprising:
one or more processors configured to execute instructions stored in one or more memories to cause the second wireless communication device to:
transmit, to a first wireless communication device, a first plurality radio frequency (RF) signals; and
receive, based on the first plurality of RF signals, information indicating a waveform for the second wireless communication device to use to transmit a second plurality of RF signals to the first wireless communication device, wherein the information indicating the waveform comprises:
a load resistance value of the first wireless communication device; and
an average input power at the first wireless communication device associated with the first plurality of RF signals; and
transmit the second plurality of RF signals using the indicated waveform.

24. The second wireless communication device of claim 23, wherein:
the one or more processors are further configured to cause the first wireless communication device to transmit the second plurality of RF signals having the indicated waveform; and
a waveform of the first plurality of RF signals is different from the waveform of the second plurality of RF signals.

25. The second wireless communication device of claim 23, wherein an RF-to-direct-current (DC) conversion efficiency associated with harvesting power from the second plurality of RF signals is greater that an RF-to-DC conversion efficiency associated with harvesting power from the first plurality of RF signals.

* * * * *